Figure 1:
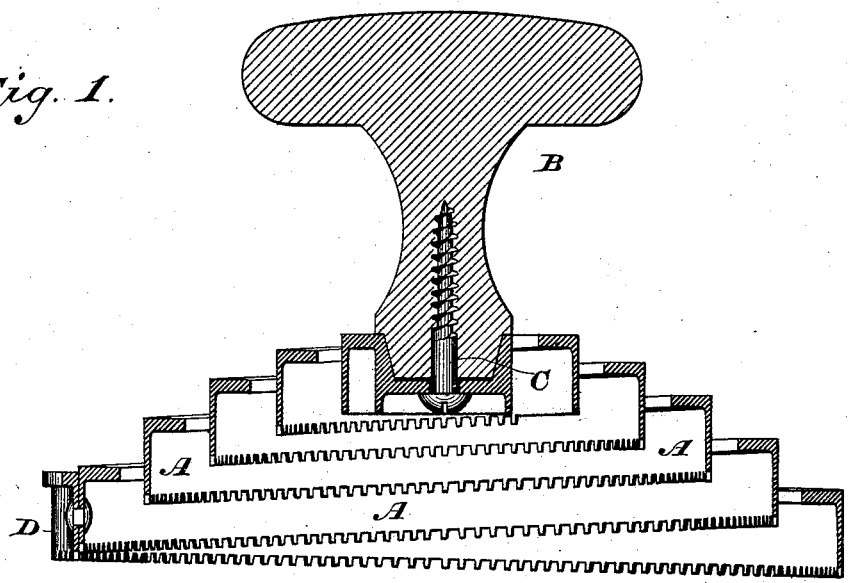

2 Sheets—Sheet 1.

P. PLANT.
Curry-Comb.

No. 220,986. Patented Oct. 28, 1879.

WITNESSES
Wm A Skinkle
Geo N Breck.

INVENTOR
Paschal Plant,
By his Attorneys
Baldwin, Hopkins, & Peyton.

2 Sheets—Sheet 2.

P. PLANT.
Curry-Comb.

No. 220,986. Patented Oct. 28, 1879.

WITNESSES
Wm A Skinkle
Geo W Breck

INVENTOR
Paschal Plant.
By his Attorneys
Baldwin, Hopkins, & Peyton.

UNITED STATES PATENT OFFICE.

PASCHAL PLANT, OF WASHINGTON, DISTRICT OF COLUMBIA.

IMPROVEMENT IN CURRY-COMBS.

Specification forming part of Letters Patent No. 220,986, dated October 28, 1879; application filed February 7, 1879.

*To all whom it may concern:*

Be it known that I, PASCHAL PLANT, of Washington, in the District of Columbia, have invented a new and useful Curry-Comb, of which the following is a specification.

In the use of ordinary curry-combs to comb and clean the hair of horses and other domestic animals serious injuries to their skins are frequently inflicted, owing to the carelessness or cruelty of hostlers, either by laceration or by such harsh rubbing as to produce inflammation and develop cutaneous diseases; and it is one object of my invention to prevent these evils and protect domestic animals by providing a simple, cheap, and durable curry-comb, in the use of which, even by careless, rough, and unfeeling persons, there will be no liability to inflict injury.

Furthermore, a common curry-comb is an injurious weapon in the hands of persons who ordinarily have immediate care of domestic animals, and injuries occasioned by blows struck with it while cleaning the animals are of not uncommon occurrence; and it is another object of my invention to provide a curry-comb that cannot readily be used to injure animals by blows. Accordingly I proceed in an entirely novel and original manner to form a curry-comb. I ordinarily take a light strip of steel or other suitable material, from three to four feet long, and serrate one of its edges to form the comb-teeth, and then I coil it into a volute spring, securing its outer end by an abrupt bend to the outside coil by means of a rivet serving as a pivot, or by brazing or otherwise. I then attach a flexible loop or knob or bent handle to its center, and the curry-comb is complete, and the comb part is somewhat conical in contour.

In use the pressure of the hand of the operator will be directly on the center, and will be communicated to the intermediate and outer portions of the comb by the torsional action of the spring; but it will be possible to press the center down hard upon the animal, and thus, did I not provide against it, injury might be inflicted as in the use of the ordinary rigid curry-combs. Therefore, to prevent this, I do not form teeth on that end of the strip which is to constitute the center of the brush, and I sometimes make the strips thicker there, so as to blunt their edges in this part of the comb; or I may cover them with a cap of metal, leather, rubber, or the like, after the comb is otherwise formed.

Instead of using a plain rectangular strip of metal, I may use one thicker at the back than at the toothed edge, or a rolled angle-strip, or a strip having a flange secured on its back edge, or a T-shaped strip, the form being immaterial so long as the elements of lightness, cheapness, and proper resilience are present. A thin light strip of steel provided with teeth may be stiffened by backing up or flanging with other metal, so as to give proper strength, and so as to keep the coils in proper relative position—that is, at a suitable distance apart, which is necessary in all cases.

Figure 2:
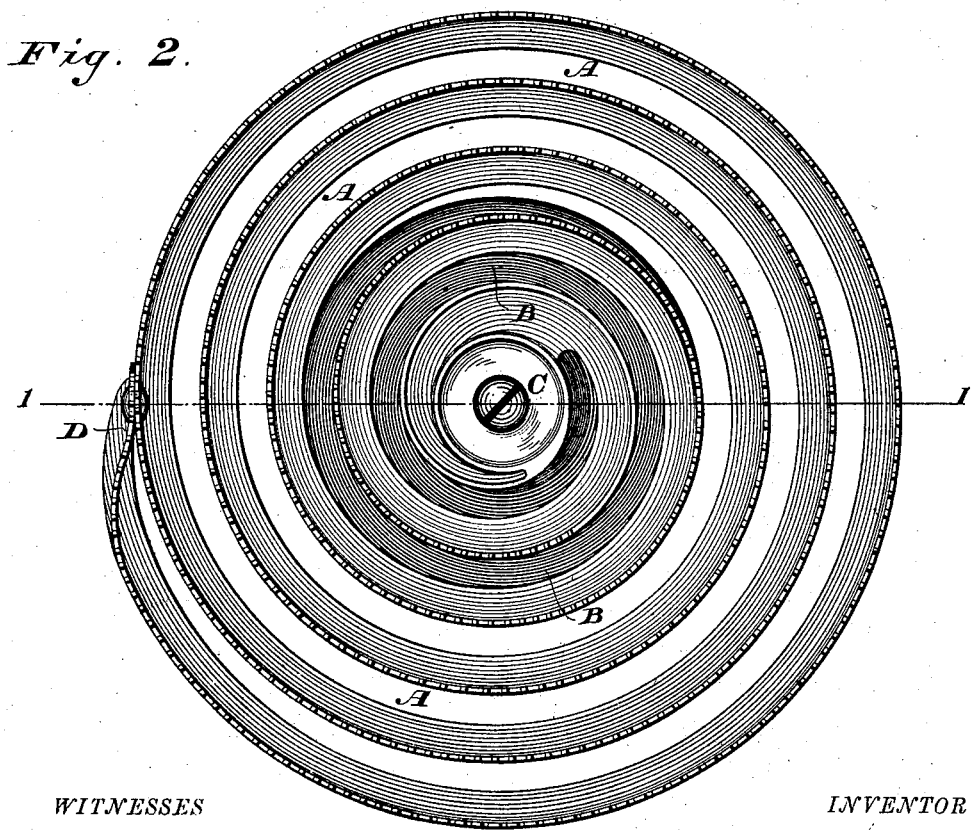
Figure 3:
Figure 4:
Figure 5:
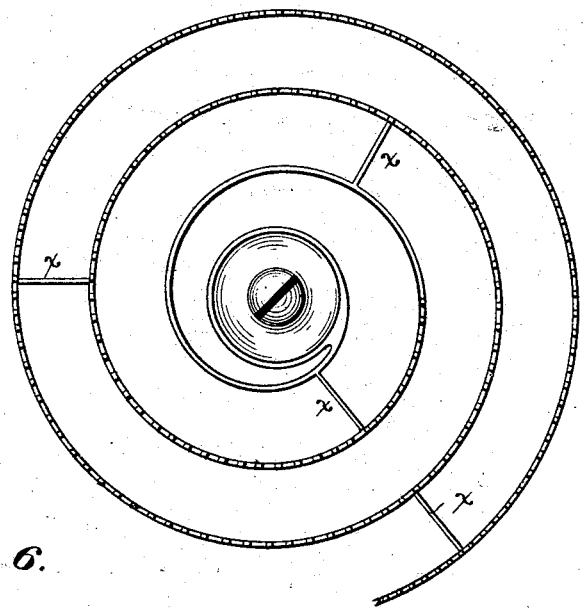
Figure 6:
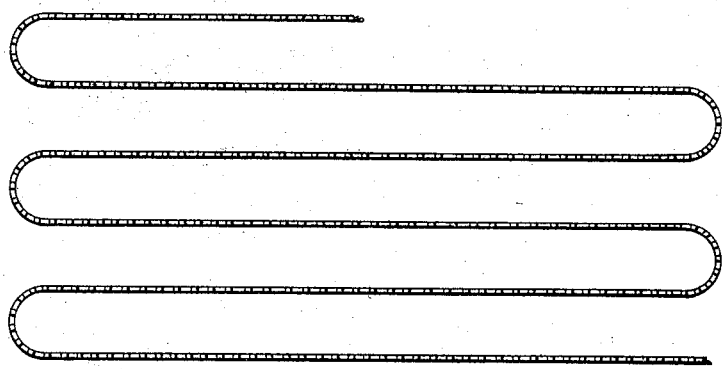

In the accompanying drawings, which illustrate my invention, Figure 1 is a vertical central section of my curry-comb, and Fig. 2 is a bottom-plan view. Figs. 3 and 4 show cross-sections of metal strips of modified forms. Fig. 5 shows a strip coiled with stay-pieces $x$ between the coils to keep them in place, there being no flange or stiffening-rib on the strip. Fig. 6 shows a sinuous strip folded upon itself repeatedly.

A indicates the volute coil, or comb proper; B, the knob or handle, and C a screw for securing the handle to the comb; but, of course, the handle may be of other ordinary form and secured by other means; or may consist of a mere strap to go over the back of the hand, secured around the central toothless coils. In this case, and when the outer end, D, of the strip is brazed to the outer coil, the entire curry-comb consists of only two pieces—the coil and the strap.

I may also form a brush on this principle, the bristles being secured to the strip before or after coiling, or between two strips, one at least of which is of a springy nature, as will be obvious upon mere suggestion.

In the use of this curry-comb, when the spring has proper resiliency it is impossible to scratch an animal injuriously, because all the toothed parts of the comb will yield and bend back under pressure on the center by the hand. Besides this, all parts of the comb, even the handle, will yield when a blow is struck with it, and protect the animal like a cushion.

It is not absolutely necessary to coil the strip in the form of a volute spring, as it may be coiled like the mainspring of a watch; but I prefer a volute coil. In case the coils are all made over each other, like the coils of a watch-spring, it is better to form the toothless portion of the strip a little narrower than the toothed portion, so that the comb-teeth will project beyond the plane of the untoothed coils.

It will be found to be a good plan to taper the strip so as to have it wider at its outer end than at its inner end.

When it is desirable to have the outer coils exceedingly yielding, the strip can be tapered oppositely to what has just been described.

Instead of coiling a toothed strip, I can form a curry-comb of a sinuous strip with numerous folds, as shown in Fig. 6; but I prefer the coil form.

In some cases it may be desirable to brace the coils apart by light stays, such as shown in Fig. 5; but if the coils are properly set and stiffened, this will not be necessary.

I am aware that heretofore brushes have been made of strips of hard rubber and other materials, having suitable teeth cut in them, by coiling or otherwise disposing them upon ordinary rigid backs; but this forms no part of my invention.

Having thus described my invention, what I claim as new, and desire to secure by Letters Patent, is—

As a new article of manufacture, a flexible curry-comb formed of a toothed strip of metal or other suitable material, without a plate or back, and with a suitable handle attached directly to the strip, substantially as described.

In testimony whereof I have hereunto subscribed my name.

PASCHAL PLANT.

Witnesses:
MARCUS S. HOPKINS,
G. M. MAYNADIER.